(12) United States Patent
Rosenfelder et al.

(10) Patent No.: US 10,135,561 B2
(45) Date of Patent: *Nov. 20, 2018

(54) MULTIPLEXING TWO SEPARATE OPTICAL LINKS WITH THE SAME WAVELENGTH USING ASYMMETRIC COMBINING AND SPLITTING

(71) Applicant: Corning Optical Communications Wireless Ltd, Airport City (IL)

(72) Inventors: Pinhas Yehuda Rosenfelder, Beit-Shemesh (IL); Carmi Shapira, Matetihu (IL)

(73) Assignee: Corning Optical Communications Wireless Ltd, Airport City (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/655,228

(22) Filed: Jul. 20, 2017

(65) Prior Publication Data

US 2017/0324505 A1 Nov. 9, 2017

Related U.S. Application Data

(63) Continuation of application No. 14/962,279, filed on Dec. 8, 2015, now Pat. No. 9,729,267.
(Continued)

(51) Int. Cl.
*H04J 14/02* (2006.01)
*H04B 10/2507* (2013.01)
*H04B 10/25* (2013.01)

(52) U.S. Cl.
CPC ...... *H04J 14/0282* (2013.01); *H04B 10/2503* (2013.01); *H04B 10/2507* (2013.01);
(Continued)

(58) Field of Classification Search
None
See application file for complete search history.

(56) References Cited

U.S. PATENT DOCUMENTS 4,365,865 A 12/1982 Stiles
4,449,246 A 5/1984 Seiler et al.
(Continued)

FOREIGN PATENT DOCUMENTS

AU 645192 B 10/1992
AU 731180 B2 3/1998
(Continued)

OTHER PUBLICATIONS

Examination Report for European patent application 10702806.0 dated Sep. 12, 2013, 11 pages.
(Continued)

*Primary Examiner* — Li Liu
(74) *Attorney, Agent, or Firm* — C. Keith Montgomery

(57) ABSTRACT

An optical communications system includes an optical transmitter and an optical receiver optically coupled to an optical combiner/splitter, the combiner/splitter coupled to optical media; and, another optical transmitter and another optical receiver optically coupled to another optical combiner/splitter, the another combiner/splitter remotely coupled to the optical media; wherein the optical transmitter and the another optical transmitter are configured to transmit optical signals at substantially the same wavelength.

8 Claims, 3 Drawing Sheets

Related U.S. Application Data

(60) Provisional application No. 62/090,658, filed on Dec. 11, 2014.

(52) U.S. Cl.
CPC ...... *H04J 14/0204* (2013.01); *H04J 14/0205* (2013.01); *H04J 14/0256* (2013.01); *H04J 14/0279* (2013.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,943,136 A * | 7/1990 | Popoff ................ G02B 6/2804 385/46 |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,159,479 A | 10/1992 | Takagi |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,455,592 A | 10/1995 | Huddle |
| 5,457,557 A | 10/1995 | Zarem et al. |
| 5,459,727 A | 10/1995 | Vannucci |
| 5,469,523 A | 11/1995 | Blew et al. |
| 5,500,763 A * | 3/1996 | Ota .................... H04B 10/2972 359/333 |
| 5,502,446 A | 3/1996 | Denninger |
| 5,513,176 A | 4/1996 | Dean et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,583,517 A | 12/1996 | Yokev et al. |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,661,582 A | 8/1997 | Kintis et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,789 A | 6/1998 | van der Kaay et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,828,658 A | 10/1998 | Ottersten et al. |
| 5,832,379 A | 11/1998 | Mallinckrodt |
| 5,835,857 A | 11/1998 | Otten |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 5,995,832 A | 11/1999 | Mallinckrodt |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,031,645 A * | 2/2000 | Ichikawa ........... H04B 10/2503 398/139 |
| 6,037,898 A | 3/2000 | Parish et al. |
| 6,049,705 A | 4/2000 | Xue |
| 6,061,161 A | 5/2000 | Yang et al. |
| 6,069,721 A | 5/2000 | Oh et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |

(56) References Cited

U.S. PATENT DOCUMENTS

| | | | |
|---|---|---|---|
| 6,157,810 A | 12/2000 | Georges et al. | |
| 6,192,216 B1 | 2/2001 | Sabat, Jr. et al. | |
| 6,194,968 B1 | 2/2001 | Winslow | |
| 6,198,432 B1 | 3/2001 | Janky | |
| 6,211,978 B1 * | 4/2001 | Wojtunik | H04B 10/2503 |
| | | | 385/24 |
| 6,212,397 B1 | 4/2001 | Langston et al. | |
| 6,222,503 B1 | 4/2001 | Gietema | |
| 6,223,201 B1 | 4/2001 | Reznak | |
| 6,232,870 B1 | 5/2001 | Garber et al. | |
| 6,236,784 B1 * | 5/2001 | Ido | G02B 6/125 |
| | | | 385/39 |
| 6,236,789 B1 | 5/2001 | Fitz | |
| 6,236,863 B1 | 5/2001 | Waldroup et al. | |
| 6,240,274 B1 | 5/2001 | Izadpanah | |
| 6,268,946 B1 | 7/2001 | Larkin et al. | |
| 6,275,990 B1 | 8/2001 | Dapper et al. | |
| 6,279,158 B1 | 8/2001 | Geile et al. | |
| 6,286,163 B1 | 9/2001 | Trimble | |
| 6,292,673 B1 | 9/2001 | Maeda et al. | |
| 6,295,451 B1 | 9/2001 | Mimura | |
| 6,301,240 B1 | 10/2001 | Slabinski et al. | |
| 6,307,869 B1 | 10/2001 | Pawelski | |
| 6,308,085 B1 | 10/2001 | Shoki | |
| 6,314,163 B1 | 11/2001 | Acampora | |
| 6,317,599 B1 | 11/2001 | Rappaport et al. | |
| 6,323,980 B1 | 11/2001 | Bloom | |
| 6,324,391 B1 | 11/2001 | Bodell | |
| 6,330,241 B1 | 12/2001 | Fort | |
| 6,330,244 B1 | 12/2001 | Swartz et al. | |
| 6,334,219 B1 | 12/2001 | Hill et al. | |
| 6,336,021 B1 | 1/2002 | Nukada | |
| 6,336,042 B1 | 1/2002 | Dawson et al. | |
| 6,337,754 B1 | 1/2002 | Imajo | |
| 6,340,932 B1 | 1/2002 | Rodgers et al. | |
| 6,353,406 B1 | 3/2002 | Lanzl et al. | |
| 6,353,600 B1 | 3/2002 | Schwartz et al. | |
| 6,359,714 B1 | 3/2002 | Imajo | |
| 6,370,203 B1 | 4/2002 | Boesch et al. | |
| 6,374,078 B1 | 4/2002 | Williams et al. | |
| 6,374,124 B1 | 4/2002 | Slabinski | |
| 6,389,010 B1 | 5/2002 | Kubler et al. | |
| 6,400,318 B1 | 6/2002 | Kasami et al. | |
| 6,400,418 B1 | 6/2002 | Wakabayashi | |
| 6,404,775 B1 | 6/2002 | Leslie et al. | |
| 6,405,018 B1 | 6/2002 | Reudink et al. | |
| 6,405,058 B2 | 6/2002 | Bobier | |
| 6,405,308 B1 | 6/2002 | Gupta et al. | |
| 6,414,624 B2 | 7/2002 | Endo et al. | |
| 6,415,132 B1 | 7/2002 | Sabat, Jr. | |
| 6,421,327 B1 | 7/2002 | Lundby et al. | |
| 6,438,301 B1 | 8/2002 | Johnson et al. | |
| 6,438,371 B1 | 8/2002 | Fujise et al. | |
| 6,448,558 B1 | 9/2002 | Greene | |
| 6,452,915 B1 | 9/2002 | Jorgensen | |
| 6,459,519 B1 | 10/2002 | Sasai et al. | |
| 6,459,989 B1 | 10/2002 | Kirkpatrick et al. | |
| 6,477,154 B1 | 11/2002 | Cheong et al. | |
| 6,480,702 B1 | 11/2002 | Sabat, Jr. | |
| 6,486,907 B1 | 11/2002 | Farber et al. | |
| 6,496,290 B1 | 12/2002 | Lee | |
| 6,501,965 B1 | 12/2002 | Lucidarme | |
| 6,504,636 B1 | 1/2003 | Seto et al. | |
| 6,504,831 B1 | 1/2003 | Greenwood et al. | |
| 6,512,478 B1 | 1/2003 | Chien | |
| 6,519,395 B1 | 2/2003 | Bevan et al. | |
| 6,519,449 B1 | 2/2003 | Zhang et al. | |
| 6,525,855 B1 | 2/2003 | Westbrook et al. | |
| 6,535,330 B1 | 3/2003 | Lelic et al. | |
| 6,535,720 B1 | 3/2003 | Kintis et al. | |
| 6,553,239 B1 | 4/2003 | Langston | |
| 6,556,551 B1 | 4/2003 | Schwartz | |
| 6,577,794 B1 | 6/2003 | Currie et al. | |
| 6,577,801 B2 | 6/2003 | Broderick et al. | |
| 6,580,393 B2 | 6/2003 | Holt | |
| 6,580,402 B2 | 6/2003 | Navarro et al. | |
| 6,580,905 B1 | 6/2003 | Naidu et al. | |
| 6,580,918 B1 | 6/2003 | Leickel et al. | |
| 6,583,763 B2 | 6/2003 | Judd | |
| 6,587,514 B1 | 7/2003 | Wright et al. | |
| 6,594,496 B2 | 7/2003 | Schwartz | |
| 6,597,325 B2 | 7/2003 | Judd et al. | |
| 6,598,009 B2 | 7/2003 | Yang | |
| 6,606,430 B2 | 8/2003 | Bartur et al. | |
| 6,615,074 B2 | 9/2003 | Mickle et al. | |
| 6,628,732 B1 | 9/2003 | Takaki | |
| 6,634,811 B1 | 10/2003 | Gertel et al. | |
| 6,636,747 B2 | 10/2003 | Harada et al. | |
| 6,640,103 B1 | 10/2003 | Inman et al. | |
| 6,643,437 B1 | 11/2003 | Park | |
| 6,652,158 B2 | 11/2003 | Bartur et al. | |
| 6,654,590 B2 | 11/2003 | Boros et al. | |
| 6,654,616 B1 | 11/2003 | Pope, Jr. et al. | |
| 6,657,535 B1 | 12/2003 | Magbie et al. | |
| 6,658,269 B1 | 12/2003 | Golemon et al. | |
| 6,665,308 B1 | 12/2003 | Rakib et al. | |
| 6,670,930 B2 | 12/2003 | Navarro | |
| 6,675,294 B1 | 1/2004 | Gupta et al. | |
| 6,678,509 B2 | 1/2004 | Skarman et al. | |
| 6,687,437 B1 | 2/2004 | Starnes et al. | |
| 6,690,328 B2 | 2/2004 | Judd | |
| 6,696,917 B1 | 2/2004 | Heitner et al. | |
| 6,697,603 B1 | 2/2004 | Lovinggood et al. | |
| 6,704,298 B1 | 3/2004 | Matsumiya et al. | |
| 6,704,545 B1 | 3/2004 | Wala | |
| 6,710,366 B1 | 3/2004 | Lee et al. | |
| 6,714,800 B2 | 3/2004 | Johnson et al. | |
| 6,731,880 B2 | 5/2004 | Westbrook et al. | |
| 6,745,013 B1 | 6/2004 | Porter et al. | |
| 6,758,913 B1 | 7/2004 | Tunney et al. | |
| 6,763,226 B1 | 7/2004 | McZeal, Jr. | |
| 6,771,862 B2 | 8/2004 | Karnik et al. | |
| 6,771,933 B1 | 8/2004 | Eng et al. | |
| 6,784,802 B1 | 8/2004 | Stanescu | |
| 6,785,558 B1 | 8/2004 | Stratford et al. | |
| 6,788,666 B1 | 9/2004 | Linebarger et al. | |
| 6,801,767 B1 | 10/2004 | Schwartz et al. | |
| 6,807,374 B1 | 10/2004 | Imajo et al. | |
| 6,812,824 B1 | 11/2004 | Goldinger et al. | |
| 6,812,905 B2 | 11/2004 | Thomas et al. | |
| 6,823,174 B1 | 11/2004 | Masenten et al. | |
| 6,826,163 B2 | 11/2004 | Mani et al. | |
| 6,826,337 B2 | 11/2004 | Linnell | |
| 6,836,660 B1 | 12/2004 | Wala | |
| 6,836,673 B1 | 12/2004 | Trott | |
| 6,842,433 B2 | 1/2005 | West et al. | |
| 6,842,459 B1 | 1/2005 | Binder | |
| 6,847,856 B1 | 1/2005 | Bohannon | |
| 6,850,510 B2 | 2/2005 | Kubler | |
| 6,865,390 B2 | 3/2005 | Goss et al. | |
| 6,873,823 B2 | 3/2005 | Hasarchi | |
| 6,876,056 B2 | 4/2005 | Tilmans et al. | |
| 6,879,290 B1 | 4/2005 | Toutain et al. | |
| 6,882,311 B2 | 4/2005 | Walker et al. | |
| 6,883,710 B2 | 4/2005 | Chung | |
| 6,885,344 B2 | 4/2005 | Mohamadi | |
| 6,885,846 B1 | 4/2005 | Panasik et al. | |
| 6,889,060 B2 | 5/2005 | Fernando et al. | |
| 6,895,249 B2 | 5/2005 | Gaal | |
| 6,909,399 B1 | 6/2005 | Zegelin et al. | |
| 6,914,539 B2 | 7/2005 | Hoctor et al. | |
| 6,915,058 B2 | 7/2005 | Pons | |
| 6,915,529 B1 | 7/2005 | Suematsu et al. | |
| 6,919,858 B2 | 7/2005 | Rofougaran | |
| 6,920,330 B2 | 7/2005 | Caronni et al. | |
| 6,924,997 B2 | 8/2005 | Chen et al. | |
| 6,930,987 B2 | 8/2005 | Fukuda et al. | |
| 6,931,183 B2 | 8/2005 | Panak et al. | |
| 6,931,659 B1 | 8/2005 | Kinemura | |
| 6,933,849 B2 | 8/2005 | Sawyer | |
| 6,934,511 B1 | 8/2005 | Lovinggood et al. | |
| 6,934,541 B2 | 8/2005 | Miyatani | |
| 6,941,112 B2 | 9/2005 | Hasegawa | |
| 6,946,989 B2 | 9/2005 | Vavik | |

(56) References Cited

U.S. PATENT DOCUMENTS

| | | |
|---|---|---|
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,039 B2 | 2/2006 | Miyamoto et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,023,382 B1 | 4/2006 | Akano |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,726 B2 | 8/2006 | Shi et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,123,939 B1 | 10/2006 | Bird et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,250,907 B2 | 7/2007 | Krumm et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,429,951 B2 | 9/2008 | Kennedy, Jr. et al. |
| 7,442,679 B2 | 10/2008 | Stolle et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,453,363 B2 | 11/2008 | Reynolds |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,715,722 B1 | 5/2010 | Hoke et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,854 B2 | 8/2010 | Conyers et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |

(56) References Cited

U.S. PATENT DOCUMENTS

| | | |
|---|---|---|
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,031,121 B2 | 10/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,174,428 B2 | 5/2012 | Wegener |
| 8,274,929 B2 | 9/2012 | Schmidt et al. |
| 8,275,265 B2 | 9/2012 | Kobyakov et al. |
| 8,279,800 B2 | 10/2012 | Schmidt et al. |
| 8,310,963 B2 | 11/2012 | Singh |
| 8,346,091 B2 | 1/2013 | Kummetz et al. |
| 8,422,884 B2 | 4/2013 | Mao |
| 8,467,823 B2 | 6/2013 | Seki et al. |
| 8,548,330 B2 | 10/2013 | Berlin et al. |
| 8,548,526 B2 | 10/2013 | Schmidt et al. |
| 8,583,100 B2 | 11/2013 | Koziy et al. |
| 8,599,794 B2 | 12/2013 | Ahmadi |
| 8,634,766 B2 | 1/2014 | Hobbs et al. |
| 8,676,214 B2 | 3/2014 | Fischer et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,881 B1* | 4/2014 | Iannone ............... H04J 14/0282 398/100 |
| 8,699,982 B2 | 4/2014 | Singh |
| 8,737,300 B2 | 5/2014 | Stapleton et al. |
| 8,792,933 B2 | 7/2014 | Chen |
| 8,873,585 B2 | 10/2014 | Oren et al. |
| 8,908,607 B2 | 12/2014 | Kummetz et al. |
| 8,913,892 B2 | 12/2014 | Berlin et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,130,613 B2 | 9/2015 | Oren et al. |
| 9,258,052 B2* | 2/2016 | George ............... H04B 7/0413 |
| 9,432,095 B2 | 8/2016 | Berlin et al. |
| 9,525,472 B2 | 12/2016 | George et al. |
| 9,531,452 B2 | 12/2016 | George et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012495 A1 | 1/2002 | Sasai et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0085643 A1 | 7/2002 | Kitchener et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Amon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0033076 A1* | 2/2004 | Song ................... H04J 14/0216 398/70 |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0068751 A1 | 4/2004 | Basawapatna et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0102196 A1 | 5/2004 | Weckstrom et al. |
| 2004/0105435 A1 | 6/2004 | Morioka |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0164902 A1 | 8/2004 | Karlsson et al. |
| 2004/0165568 A1 | 8/2004 | Weinstein |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0041693 A1 | 2/2005 | Priotti |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |

(56) References Cited

U.S. PATENT DOCUMENTS

| | | |
|---|---|---|
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0025101 A1 | 2/2006 | Li |
| 2006/0028352 A1 | 2/2006 | McNamara et al. |
| 2006/0045054 A1 | 3/2006 | Utsumi et al. |
| 2006/0046662 A1 | 3/2006 | Moulsley et al. |
| 2006/0056283 A1 | 3/2006 | Anikhindi et al. |
| 2006/0056327 A1 | 3/2006 | Coersmeier |
| 2006/0062579 A1 | 3/2006 | Kim et al. |
| 2006/0063494 A1 | 3/2006 | Zhang et al. |
| 2006/0094470 A1 | 5/2006 | Wake et al. |
| 2006/0104643 A1 | 5/2006 | Lee et al. |
| 2006/0120395 A1 | 6/2006 | Xing et al. |
| 2006/0128425 A1 | 6/2006 | Rooyen |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189280 A1 | 8/2006 | Goldberg |
| 2006/0189354 A1 | 8/2006 | Lee et al. |
| 2006/0203836 A1 | 9/2006 | Kim |
| 2006/0217132 A1 | 9/2006 | Drummond-Murray et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0262014 A1 | 11/2006 | Shemesh et al. |
| 2006/0268738 A1 | 11/2006 | Goerke et al. |
| 2006/0274704 A1 | 12/2006 | Desai et al. |
| 2006/0276227 A1 | 12/2006 | Dravida |
| 2007/0008939 A1 | 1/2007 | Fischer |
| 2007/0009266 A1 | 1/2007 | Bothwell |
| 2007/0040687 A1 | 2/2007 | Reynolds |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0072646 A1 | 3/2007 | Kuwahara et al. |
| 2007/0076649 A1 | 4/2007 | Lin et al. |
| 2007/0093273 A1 | 4/2007 | Cai |
| 2007/0099578 A1 | 5/2007 | Adeney et al. |
| 2007/0104165 A1 | 5/2007 | Hanaoka et al. |
| 2007/0135169 A1 | 6/2007 | Sychaleun et al. |
| 2007/0149250 A1 | 6/2007 | Crozzoli et al. |
| 2007/0155314 A1 | 7/2007 | Mohebbi |
| 2007/0166042 A1 | 7/2007 | Seeds et al. |
| 2007/0173288 A1 | 7/2007 | Skarby et al. |
| 2007/0182626 A1 | 8/2007 | Samavati et al. |
| 2007/0184841 A1 | 8/2007 | Choi et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280159 A1 | 12/2007 | Liu et al. |
| 2007/0280370 A1 | 12/2007 | Liu |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0005219 A1 | 1/2008 | Nabar et al. |
| 2008/0007453 A1 | 1/2008 | Vassilakis et al. |
| 2008/0008134 A1 | 1/2008 | Satou et al. |
| 2008/0013473 A1 | 1/2008 | Proctor, Jr. et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0084951 A1 | 4/2008 | Chen et al. |
| 2008/0089692 A1* | 4/2008 | Sorin ................ H04J 14/02 398/135 |
| 2008/0089699 A1* | 4/2008 | Li .................. H04B 10/07957 398/197 |
| 2008/0098203 A1 | 4/2008 | Master et al. |
| 2008/0107202 A1 | 5/2008 | Lee et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129594 A1 | 6/2008 | Pera et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0233967 A1 | 9/2008 | Montojo et al. |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291818 A1 | 11/2008 | Leisten |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0087179 A1 | 4/2009 | Underwood et al. |
| 2009/0088071 A1 | 4/2009 | Rofougaran |
| 2009/0092073 A1 | 4/2009 | Doppler et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0239521 A1 | 9/2009 | Mohebbi |
| 2009/0245084 A1 | 10/2009 | Moffatt et al. |
| 2009/0245153 A1 | 10/2009 | Li et al. |

(56) References Cited

U.S. PATENT DOCUMENTS

| | | |
|---|---|---|
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316609 A1 | 12/2009 | Singh |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0150060 A1 | 6/2010 | Vitek |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246541 A9 | 9/2010 | Kim |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0265874 A1 | 10/2010 | Palanki et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0013904 A1* | 1/2011 | Khermosh ......... G01M 11/3118 398/16 |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0135308 A1 | 6/2011 | Tarlazzi et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200325 A1 | 8/2011 | Kobyakov et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222616 A1 | 9/2011 | Jiang et al. |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0274433 A1* | 11/2011 | Presi ............... H04B 10/25759 398/97 |
| 2011/0281536 A1 | 11/2011 | Lee et al. |
| 2011/0305284 A1 | 12/2011 | Mueck et al. |
| 2012/0002750 A1 | 1/2012 | Hooli et al. |
| 2012/0046039 A1 | 2/2012 | Hagerman et al. |
| 2012/0087670 A1 | 4/2012 | Han et al. |
| 2012/0140660 A1 | 6/2012 | Kang et al. |
| 2012/0170542 A1 | 7/2012 | Zangi |
| 2012/0177026 A1 | 7/2012 | Uyehara et al. |
| 2012/0208581 A1 | 8/2012 | Ishida et al. |
| 2012/0213111 A1 | 8/2012 | Shimezawa et al. |
| 2012/0243513 A1 | 9/2012 | Fujishima et al. |
| 2012/0281565 A1 | 11/2012 | Sauer |
| 2012/0314797 A1 | 12/2012 | Kummetz et al. |
| 2012/0327800 A1 | 12/2012 | Kim et al. |
| 2013/0017863 A1 | 1/2013 | Kummetz et al. |
| 2013/0095875 A1 | 4/2013 | Reuven |
| 2013/0101005 A1 | 4/2013 | Aryanfar |
| 2013/0150063 A1 | 6/2013 | Berlin et al. |
| 2013/0195000 A1 | 8/2013 | Shen et al. |
| 2013/0235962 A1 | 9/2013 | O'Keefe et al. |
| 2013/0343765 A1* | 12/2013 | Rohde .................. H04B 10/27 398/139 |
| 2014/0078920 A1 | 3/2014 | Tandra et al. |
| 2014/0126914 A1 | 5/2014 | Berlin et al. |
| 2014/0211875 A1 | 7/2014 | Berlin et al. |
| 2014/0226698 A1 | 8/2014 | Negus et al. |
| 2014/0269859 A1 | 9/2014 | Hanson et al. |
| 2014/0314061 A1 | 10/2014 | Trajkovic et al. |
| 2015/0003565 A1 | 1/2015 | George et al. |
| 2015/0023283 A1 | 1/2015 | Liu et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0256237 A1 | 9/2015 | George et al. |
| 2016/0036505 A1 | 2/2016 | George et al. |
| 2016/0134348 A1 | 5/2016 | George et al. |
| 2016/0173223 A1 | 6/2016 | Rosenfelder et al. |
| 2017/0093472 A1 | 3/2017 | George et al. |

FOREIGN PATENT DOCUMENTS

| | | |
|---|---|---|
| CA | 2065090 C | 2/1998 |
| CA | 2242707 A1 | 1/1999 |
| DE | 20104862 U1 | 8/2001 |
| DE | 10249414 A1 | 5/2004 |
| EP | 0355328 A2 | 2/1990 |
| EP | 0477952 A2 | 4/1992 |
| EP | 0477952 A3 | 4/1992 |
| EP | 0709974 A1 | 5/1996 |
| EP | 0461583 B1 | 3/1997 |
| EP | 851618 A2 | 7/1998 |
| EP | 0687400 B1 | 11/1998 |
| EP | 0938204 A1 | 8/1999 |
| EP | 0993124 A2 | 4/2000 |
| EP | 1037411 A2 | 9/2000 |
| EP | 1085684 A2 | 3/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |

(56) References Cited

FOREIGN PATENT DOCUMENTS

| | | |
|---|---|---|
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2219310 A1 | 8/2010 |
| GB | 2313020 A | 11/1997 |
| GB | 2323252 A | 9/1998 |
| GB | 2399963 A | 9/2004 |
| GB | 2428149 A | 1/2007 |
| JP | H4189036 A | 7/1992 |
| JP | 05252559 A | 9/1993 |
| JP | 05260018 A | 10/1993 |
| JP | 05327569 A | 12/1993 |
| JP | 05327576 A | 12/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| KR | 20110087949 A | 8/2011 |
| WO | 9603823 A1 | 2/1996 |
| WO | 9613102 A1 | 5/1996 |
| WO | 9804054 A1 | 1/1998 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0186755 A2 | 11/2001 |
| WO | 0221183 A1 | 3/2002 |
| WO | 0230141 A1 | 4/2002 |
| WO | 02091618 A1 | 11/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2004107783 A1 | 12/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006094441 A1 | 9/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2007133630 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010087919 A2 | 8/2010 |
| WO | 2010090999 A1 | 8/2010 |
| WO | 2010132739 A1 | 11/2010 |
| WO | 2011005162 A1 | 1/2011 |
| WO | 2011043172 A1 | 4/2011 |
| WO | 2011100095 A1 | 8/2011 |
| WO | 2011112373 A1 | 9/2011 |
| WO | 2011139939 A1 | 11/2011 |
| WO | 2011158302 A1 | 12/2011 |
| WO | 2011160117 A1 | 12/2011 |
| WO | 2012024345 A2 | 2/2012 |
| WO | 2012054553 A1 | 4/2012 |
| WO | 2012148256 A1 | 11/2012 |
| WO | 2012148938 A1 | 11/2012 |
| WO | 2012148940 A1 | 11/2012 |
| WO | 2012170865 A2 | 12/2012 |
| WO | 2013009283 A1 | 1/2013 |
| WO | 2013009835 A1 | 1/2013 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Non-final Office Action for U.S. Appl. No. 13/194,429 dated Mar. 1, 2013, 22 pages.
Notice of Allowance for U.S. Appl. No. 13/194,429 dated Jul. 9, 2013, 9 pages.
International Search Report for PCT/US2011/043405 dated Apr. 25, 2012, 4 pages.
Non-final Office Action for U.S. Appl. No. 11/958,062 dated Nov. 6, 2013, 16 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report and Written Opinion for PCT/US2007/025855 dated Mar. 19, 2008, 14 pages.
International Preliminary Report on Patentability for PCT/US2007/025855 dated Jul. 2, 2009, 9 pages.
Bahl et al. "Enhancements to the RADAR User Location and Tracking System," Microsoft Research Technical Report, Feb. 2000, pp. 1-13.
Frikel et al, "A Robust Mobile Positioning Algorithm," EURASIP Proceedings, ISCCSP 2006, pp. 1-4.

(56) References Cited

OTHER PUBLICATIONS

Pahlavan et al, "An Overview of Wireless Indoor Geolocation Techniques and Systems," LNCS 1818, pp. 1-13, 2000.
Wann et al, "Hybrid TDOA/AOA Indoor Positioning and Tracking Using Extended Kalman Filters," 63rd IEEE VTC 2006, pp. 1058-1062.
Ibernon-Fernandez, R., et al., "Comparison Between Measurements and Simulations of Conventional and Distributed MIMO System," IEEE Antennas and Wireless Propagation Letters, vol. 7, Aug. 2008, pp. 546-549.
Tarlazzi L, et al., "Characterization of an Interleaved F-DAS MIMO Indoor Propagation Channel," Loughborough Antennas & Propagation Conference, Nov. 2010, Loughborough, United Kingdom, IEEE, pp. 505-508.
Tolli, Antti, "Resource Management in Cooperative MIMO-OFDM Cellular Systems," Academic Dissertation—ACTA Universitatis Ouluensis, No. C Technica 296, Apr. 11, 2008, pp. 1-198
Vitucci, E.M., et al., "Analysis of the Performance of LTE Systems in an Interleaved F-DAS MIMO Indoor Environment," Proceedings of the 5th European Conference on Antennas and Propagation (EUCAP), Apr. 11-15, 2011, Rome, Italy, IEEE, pp. 2184-2186.
Wei, Xinning, et al., "Cooperative communication with partial channel-state information in multiuser MIMO systems," International Journal of Electronics and Communications, vol. 65, No. 4, Apr. 2011 (available online May 15, 2010), Elsevier GmbH, pp. 349-360.
International Search Report for PCT/US2013/070489 dated Feb. 24, 2014, 4 pages.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 dated Sep. 16, 2013, 3 pages.
Final Office Action for U.S. Appl. No. 12/712,758 dated May 24, 2013, 17 pages.
Non-final Office Action for U.S. Appl. No. 12/712,758 dated Jan. 10, 2012, 14 pages.
Examination Report for European patent application 07835803.3 dated Aug. 13, 2013, 6 pages.
Extended European Search Report for patent application 10014262.9 dated Mar. 14, 2011, 6 pages.
International Search Report and Written Opinion for PCT/US2012/034853 dated Aug. 6, 2012, 12 pages.
International Search Report and Written Opinion for PCT/US2012/034855 dated Jul. 26, 2012, 10 pages.
Written Opinion of the International Searching Authority for European patent application 11701916.6 dated Sep. 21, 2012, 10 pages.
International Search Report for PCT/US2011/021799 dated Apr. 6, 2011, 4 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Hansryd, Jonas et al., "Microwave capacity evolution," Ericsson Review, Jun. 21, 2011, 6 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Examination Report for European Patent Application No. 11733965.5 dated Oct. 10, 2014, 6 pages.
International Search Report for PCT/US2013/034328 dated Jul. 3, 2013, 5 pages.
International Preliminary Report on Patentability for PCT/US2013/034328 dated Oct. 1, 2014, 8 pages.
Non-final Office Action for U.S. Appl. No. 13/598,078 dated Dec. 22, 2014, 7 pages.
Non-Final Office Action for U.S. Appl. No. 14/078,949 dated Sep. 10, 2015, 29 pages.
Notice of Allowance for U.S. Appl. No. 13/598,078 dated May 12, 2015, 8 pages.
Non-final Office Action for U.S. Appl. No. 14/148,908 dated May 22, 2015, 20 pages.
Notice of Allowance for U.S. Appl. No. 14/242,139 dated Oct. 22, 2014, 12 pages.
Diehm, et al., "The FUTON Prototype: Broadband Communication through Coordinated Multi-Point using a Novel Integrated Optical/Wireless Architecture," Presented at Globecom Workshops, Dec. 6-10, 2010, Miami, Florida, IEEE, pp. 757-762.
Fan, Shu-Hao et al., "Spectrally Efficient 60-GHz xy-MIMO Data Transport over a Radio-Over-Fiber System for Gigabit Wireless Local Area Networks," Presented at IEEE Global Telecommunications Conference, Dec. 6-10, 2010, Miami, Florida, IEEE, 4 pages.
Lee et al., "Evaluation of 60 GHz MIMO Channel Capacity in the Conference Room STA-STA Scenario," Vehicular Technology Conference (VTC Sping), 2011 IEEE 73rd, pp. 1-5, May 15-18, 2011.
Sheldon, C. et al., "A 60GHz Line-of-Sight 2×2 MIMO Link Operating at 1.2 Gbps," Presented at Antennas and Propogation Society International Symposium, Jul. 5-11, 2008, San Diego, California, IEEE, 4 pages.
Written Opinion for European Patent Application No. 13798863.0 dated Aug. 6, 2015, 10 pages.
Non-final Office Action for U.S. Appl. No. 14/487,232 dated Jun. 23, 2015, 15 pages.
Notice of Allowance for U.S. Appl. No. 14/227,108 dated Nov. 18, 2015, 8 pages.
Final Office Action for U.S. Appl. No. 14/487,232 dated Oct. 15, 2015, 7 pages.
Author Unknown, "Fiber Optic Distributed Antenna System," Installation and Users Guide, ERAU Version 1.5, May 2002, Andrews Corporation, 53 pages.

(56) References Cited

OTHER PUBLICATIONS

Heath, Robert, et al., "Multiuser MIMO in Distributed Antenna Systems with Out-of-Cell Interference," IEEE Transactions on Signal Processing, vol. 59, Issue 10, Oct. 2011, IEEE, 4885-4899.
Notice of Allowance for U.S. Appl. No. 14/078,949 dated Feb. 3, 2016, 9 pages.
Non-final Office Action for U.S. Appl. No. 14/079,977 dated Mar. 4, 2016, 21 pages.
Notice of Allowance for U.S. Appl. No. 14/079,977 dated Apr. 29, 2016, 8 pages.
Non-final Office Action for U.S. Appl. No. 14/447,014 dated Jan. 20, 2016, 6 pages.
Non-final Office Action for U.S. Appl. No. 14/721,357, dated Jan. 4, 2016, 10 pages.
Final Office Action for U.S. Appl. No. 14/721,357 dated Mar. 1, 2016, 12 pages.
Advisory Action for U.S. Appl. No. 14/721,357, dated Jun. 30, 2016, 3 pages.
Notice of Allowance for U.S. Appl. No. 14/721,357, dated Aug. 16, 2016, 7 pages.
Non-Final Office Action for U.S. Appl. No. 14/962,279, dated Jan. 27, 2017, 18 pages.
Non-Final Office Action for U.S. Appl. No. 14/997,694, dated Feb. 8, 2017, 16 pages.
Notice of Allowance for U.S. Appl. No. 14/962,279, dated May 12, 2017, 8 pages.
Notice of Allowance for U.S. Appl. No. 14/997,694, dated Jul. 5, 2017, 8 pages.
Non-Final Office Action for U.S. Appl. No. 15/271,843, dated Jun. 21, 2017, 21 pages.
Non-Final Office Action for U.S. Appl. No. 15/372,490, dated Aug. 21, 2017, 9 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems characteristics—Optical Fibre Cables, Characteristics of a Bending Loss Insensitive Single Mode Optical Fibre and Cable for the Access Network," ITU-T Recommendation G.657, International Telecommunication Union, 20 pages.
International Search Report and Written Opinion for International patent application PCT/US2007/013802 dated May 8, 2008, 12 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 dated Aug. 30, 2012, 10 pages.
International Search Report for PCT/US2010/022847 dated Jul. 12, 2010, 3 pages.
International Search Report for PCT/US2010/022857 dated Jun. 18, 2010, 3 pages.

(56) References Cited

OTHER PUBLICATIONS

Decision on Appeal for U.S. Appl. No. 11/451,237 dated Mar. 19, 2013, 7 pages.
Decision on Rejection for Chinese patent application 200780022093.6 dated Feb. 5, 2013, 9 pages.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Final Office Action for U.S. Appl. No. 15/271,843, dated Feb. 7, 2018, 13 pages.

* cited by examiner

MULTIPLEXING TWO SEPARATE OPTICAL LINKS WITH THE SAME WAVELENGTH USING ASYMMETRIC COMBINING AND SPLITTING

PRIORITY APPLICATIONS

This application is a continuation of U.S. application Ser. No. 14/962,279 filed on Dec. 8, 2015, which claims the benefit of priority to U.S. Provisional Application No. 62/090,658, filed on Dec. 11, 2014, the content of both are relied upon and incorporated herein by reference in their entireties.

BACKGROUND

Technical Field

Embodiments disclosed herein relates to communications within an optical network, and in particular, to methods and apparatus for multiplexing data signals.

Description of the Related Art

With the exponential growth in communications, there is a continuing demand for increased capacity. Generally, expanding capacity of fiber optic systems has been achieved by installing more cables; increasing system bitrate; and by wavelength division multiplexing.

Wavelength division multiplexing (WDM) uses existing electronics and fibers, and simply shares fibers by transmitting different channels at different wavelengths. Generally, a wavelength division multiplexing (WDM) system uses a multiplexer at the transmitter to join optical signals together and a demultiplexer at the receiver to split them apart. Most wavelength division multiplexing (WDM) systems operate on single-mode fiber optical cables, which have a core diameter of 9 μm. One type of wavelength division multiplexing (WDM) system is referred to as a "coarse wavelength division multiplexing (CWDM)" system. Generally, coarse wavelength division multiplexing (CWDM) systems provide up to eight (8) or nine (9) communications channels. Coarse wavelength division multiplexing (CWDM) uses increased channel spacing (spacing between wavelength groupings) to permit use of less sophisticated transceiver equipment.

Unfortunately, with the ever increasing demand for bandwidth, this is not adequate. As cable installation is a laborious and costly process, it is desirable to increase signal transmission using existing infrastructure. Thus, what are needed are methods and apparatus to increase signal transmission over existing implementations of fiber optics.

SUMMARY

In one embodiment, an optical communications system is provided. The system includes an optical transmitter and an optical receiver optically coupled to an optical combiner/splitter, the combiner/splitter coupled to optical media; and, another optical transmitter and another optical receiver optically coupled to another optical combiner/splitter, the another combiner / splitter remotely coupled to the optical media; wherein the optical transmitter and the another optical transmitter are configured to transmit optical signals at substantially the same wavelength.

At least one of the combiner/splitter and the another combiner/splitter may include an asymmetric combiner/splitter. The asymmetric combiner/splitter may include a high transmittance ratio, $T_R$, and a low transmittance ratio, $T_R$. The high transmittance ratio, $T_R$, and the low transmittance ratio, $T_R$, may have a combination of ratios that is one of 95/5, 90/10, 85/15, 80/20, 75/25, 70/30 and a ratio therebetween. At least one of the optical transmitter and the another optical transmitter is substantially insensitive to optical interference received at the operational wavelength. The optical media may include a single-mode optical fiber. A low transmittance ratio, $T_R$, may be associated with each of the optical transmitters. A high transmittance ratio, $T_R$, may be associated with each of the optical receivers.

In another embodiment, a method for providing an optical network configured for bi-directional communication using optical signals is provided. The method includes: selecting a first operator that includes an optical transmitter and an optical receiver optically coupled to an asymmetric optical combiner/splitter, the combiner/splitter and coupling the first operator to a first end of optical media; and, selecting another operator that includes another optical transmitter and another optical receiver optically coupled to another asymmetric optical combiner/splitter, the another operator remotely coupled to the optical media.

The method may further call for selecting the another optical transmitter for operation at substantially the same wavelength as the optical transmitter. The method may further call for associating a low transmittance ratio, $T_R$, of each of the combiner/splitters with a respective one of the optical transmitters. The method may further call for associating a high transmittance ratio, $T_R$, of each of the combiner/splitters with a respective one of the optical receivers. The method may further call for selecting a Fabry-Perot laser as at least one of the optical transmitters.

In another embodiment, an optical network is provided. The network includes an optical fiber; a first plurality of optical transmitters and receivers at a first end of the optical fiber, each optical transmitter and receiver configured to transmit and receive an optical link; a first optical line terminal at a first end of the optical fiber, the first optical line terminal configured to combine or split two optical links of the same wavelength on the same media; a second plurality of optical transmitters and receivers at a second end of the optical link, each optical transmitter and receiver configured to transmit and receive an optical link; a second optical line terminal at a second end of the optical fiber, the second optical line terminal configured to combine or split two optical links of the same wavelength on the same media; a first course wide division multiplex (CWDM) terminal, the first CWDM connected at a first end to the first plurality of optical transmitters and receivers and the first optical line terminal and at a second end to the optical fiber, the first CWDM configured to route optical links bi-directionally between the first plurality of optical transmitters and receivers and the first optical line terminal and the second plurality of optical transmitters and receivers; a second course wide division multiplex (CWDM) terminal, the second CWDM connected at a first end to the second plurality of optical transmitters and receivers and the second optical line terminal and at a second end to the optical fiber, the second CWDM configured to route optical links bi-directionally between the second plurality of optical transmitters and receivers and the second optical line terminal and the first plurality of optical transmitters and receivers.

Each of the first optical line terminal and the second optical line terminal may exhibit a high transmittance ratio, $T_R$, and a low transmittance ratio. The high transmittance ratio, $T_R$, and the low transmittance ratio, $T_R$, may include a combination of ratios that is one of 95/5, 90/10, 85/15, 80/20, 75/25, 70/30 and a ratio therebetween. A combination of the high transmittance ratio, $T_R$, and the low transmittance ratio, $T_R$, may be about 90/10. At least one of the first plurality of optical transmitters and at least one of the second plurality of optical transmitters may be substantially insensitive to optical interference received at the operational wavelength. The optical fiber may be a single-mode optical fiber. The low transmittance ratio, $T_R$, may be associated with each of the optical transmitters. The high transmittance ratio, $T_R$, may be associated with each of the optical receivers.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Disclosed herein are techniques for communicating data with a single band of wavelengths using two separate optical links over a single fiber. The techniques for "same wavelength multiplexing" make use of asymmetrical combining and splitting of the single band of wavelengths. Advantageously, the techniques provide for substantially increased communication capacity over an existing fiber optic system. Prior to discussing the invention in detail, some aspects are introduced.

As discussed herein, the term "wavelength" generally relates to a group of wavelengths used for communicating an optical signal. That is, it is not required that the optical signal be communicated at precisely one wavelength, but that the optical signal is communicated in a group of wavelengths that may be functionally considered as being associated with the optical signal. More specifically, each "wavelength" may actually include a distribution wavelengths. The distribution may be centered around the identified wavelength, or the identified wavelength may simply be within the grouping of wavelengths.

As discussed herein, the term "channel," "optical link," and other similar terms generally refer to a single data stream that is communicated over communications equipment.

Figure 1:
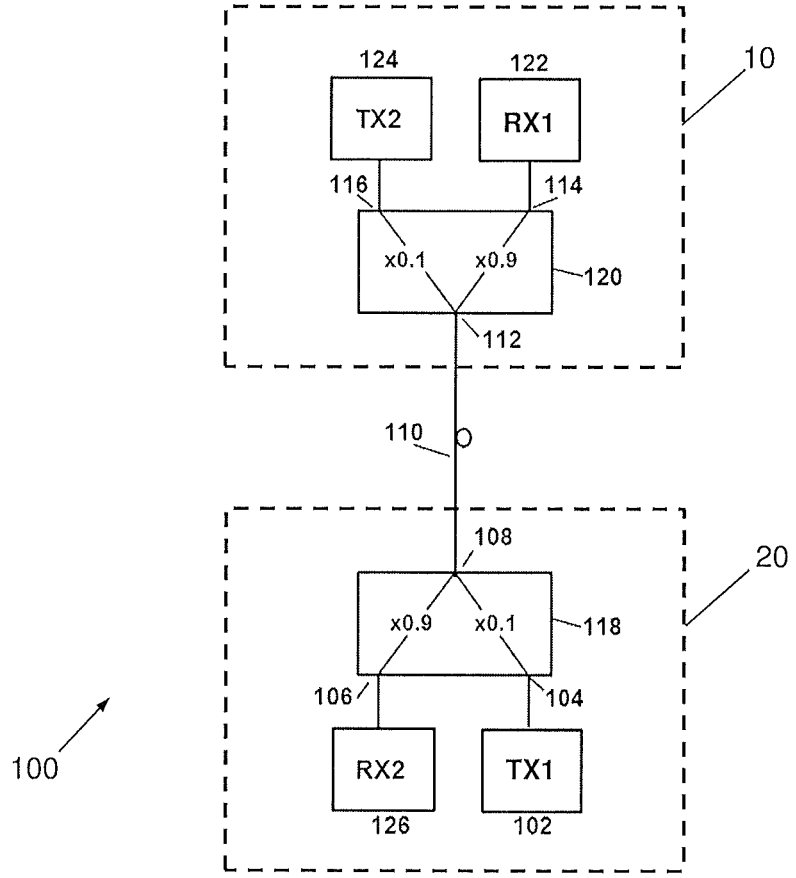
FIG. 1 is an schematic diagram depicting elements of a communications system for same wavelength signaling.

Referring now to FIG. 1, there are shown aspects of an exemplary embodiment of a communications system 100.

The communication system 100 provides for the delivery of two (2) communications channels using common communications equipment.

In this embodiment, a first operator 10 communicates with a second operator 20 over optical media 110. Exemplary optical media 110 includes a single mode optical fiber. The first operator 10 includes equipment that is substantially similar or identical to the equipment maintained by the second operator 20. Alternatively, the equipment of the first operator 10 and second operator 20 may be different. Of course, each of the first operator 10 and the second operator 20 may maintain substantially more equipment than shown here. That is, the equipment shown and described is limited to that which provides for communications according to the teachings herein. Additional equipment and components may be included as desired, but will not be discussed further herein.

More specifically, the first operator 10 includes an optical receiver 122 for a first channel (RX1) and an optical transmitter 124 for a second channel (TX2). The optical receiver 122 and the optical transmitter 124 are optically coupled to a combiner/splitter 120. The optical receiver 122 is optically coupled to the combiner/splitter 120 at receiver port 114. The optical transmitter 124 is optically coupled to the combiner/splitter 120 at transmitter port 116. The combiner/splitter 120 is optically coupled to the optical media 110 at fiber port 112.

Similarly, the second operator 20 includes an optical receiver 126 for the second channel (RX2) and an optical transmitter 102 for the first channel (TX1). The optical receiver 126 and the optical transmitter 102 are optically coupled to a combiner/splitter 118. The optical receiver 126 is optically coupled to the combiner/splitter 118 at receiver port 106. The optical transmitter 102 is optically coupled to the combiner/splitter 120 at transmitter port 104. The combiner/splitter 118 is optically coupled to the optical media 110 at fiber port 108.

It should be noted that the use of "RX" and "TX" nomenclature herein (in particular, with regards to FIGS. 1 and 2) generally refer to aspects of communications for a given channel. That is, RX refers to receiving a signal, while TX refers to transmitting a signal. The following Arabic number refers to the specific channel (channel 1, channel 2, and so on).

Each of the combiner/splitters 118, 120 is asymmetric. For example, in the embodiment shown, for the first operator 10, the combiner/splitter 120 has a transmittance ratio, $T_R$, of x0.9 from the fiber port 112 to the receiver port 114. The combiner/splitter 120 has a transmittance ratio, $T_R$, of x0.1 from the transmitter port 116 to the fiber port 112. In this exemplary embodiment, the isolation level between the transmitter port 116 and the receiver port 114 is about 60 dB. In the exemplary embodiment, the transmittance ratios, $T_R$, provide adequate attenuation between the optical transmitters 124, 102 while transmitting adequate energy to respective optical receiver 126, 122.

By appropriately configuring the communication system 100, it is possible to provide for communications where a first signal does not substantially interfere with a second signal. For example, consider a first signal generated for the first channel (TX1). The first signal is generated by the optical transmitter 102. The first signal generated by the optical transmitter 102 will be attenuated when transmitted from the respective transmit port 104 of the combiner/splitter 118 to the fiber port 108. When transmitted through the combiner/splitter 118, the first signal will be attenuated by a low transmittance ratio, $T_R$, (in this case, $T_R$=0.1).

When the first signal is received by the opposing combiner/splitter 120, the first signal will be split. A first portion of the first signal will be transmitted from fiber port 112 to the receiver port 114 and on to optical receiver 122, and will be further attenuated by a second, higher, transmittance ratio, $T_R$, (in this case, $T_R=0.9$). Accordingly, the optical energy transmitted by the optical transmitter 102 and reaching the respective optical receiver 122 will be: Energy*(0.1*0.9), or 0.09*Energy.

Similarly, a second portion of the first signal transmitted from fiber port 112 to the receiver port 116 and on to optical transmitter 124 will be further attenuated by a second, lower, transmittance ratio, $T_R$, (in this case, $T_R=0.1$). Accordingly, optical energy transmitted by the optical transmitter 102 and received at the opposing optical transmitter 124 (for TX2) will be: Energy*(0.1*0.1), or 0.01*Energy.

In general, each of the combiner/splitters 118, 120 includes an asymmetric set of transmittance ratios, $T_R$. The asymmetric set of transmittance ratios, $T_R$, includes a low coefficient and a high coefficient.

In the same example, a second signal is generated for the second channel (TX2) by the opposing optical transmitter 124. The second signal generated by the optical transmitter 124 will be attenuated by a low transmittance ratio, $T_R$, (in this case, $T_R=0.1$) when transmitted from the respective transmit port 116 of the combiner/splitter 120 to the fiber port 112. When the second signal is received by the opposing combiner/splitter 118, the second signal will be split. A first portion of the second signal transmitted from fiber port 108 to the receiver port 106 and on to optical receiver 126 will be further attenuated by a second, higher, transmittance ratio, $T_R$, (in this case, $T_R=0.9$). Accordingly, the optical energy transmitted by the optical transmitter and reaching the respective optical receiver 126 will be: Energy*(0.1*0.9), or 0.09*Energy.

Similarly, a second portion of the second signal transmitted from fiber port 108 to the receiver port 104 and on to optical transmitter 102 will be further attenuated by a second, lower, transmittance ratio, $T_R$, (in this case, $T_R=0.1$). Accordingly, optical energy transmitted by the optical transmitter 124 and received at the opposing optical transmitter 102 (for TX1) will be: Energy*(0.1*0.1), or 0.01*Energy.

In other words, by appropriately configuring the pair of combiners/splitters 118, 120, a respective optical receiver 122 will receive adequate optical energy to provide for signal discrimination. At the same time, with an appropriate type of optical transmitter, the opposing optical transmitter 124 does not receive signal energy that is substantial enough to cause interference with optical transmission.

Exemplary components for use as the optical transmitter 102, 124 include Fabry Perot lasers.

In view of the above, bi-directional communications over a single fiber with opposing optical signals that are centered around a single wavelength are achievable.

Selection of appropriate combiner/splitter components may include consideration of length of the optical media 110 (that is, a degree of attenuation within the optical media 110), power of the respective optical transmitters, types of optical transmitters, sensitivity of optical receivers, cost, availability and other such factors.

Figure 2:
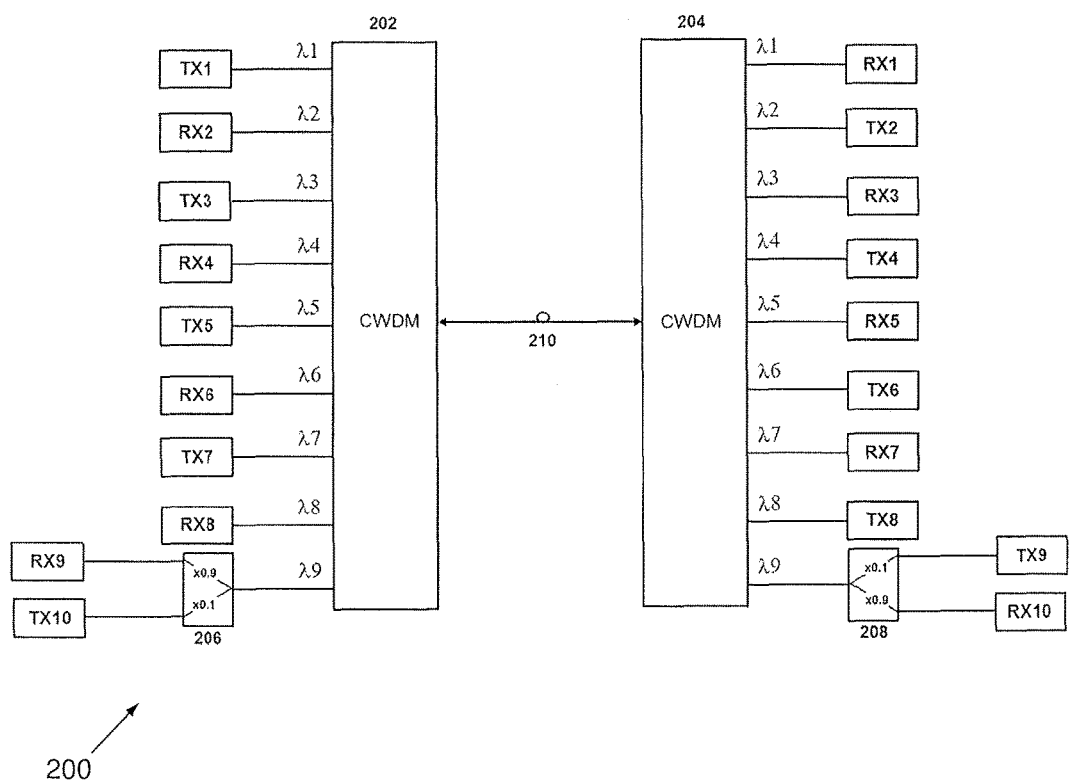
FIG. 2 is schematic diagram depicting elements of the communications system of FIG. 1 integrated into a coarse wavelength division multiplexing (CWDM) system.

FIG. 2 illustrates aspects of an exemplary embodiment of an optical network 200 that makes use of the teachings herein. Optical network 200 includes an optical fiber 210; a first plurality of optical transmitters and receivers (TX1, RX2, TX3, RX4, TX5, RX6, TX7, RX8, RX9, TX10) at a first end of the optical fiber 210, each optical transmitter and receiver is configured to transmit and receive an optical link (respectively). A second plurality of optical transmitters and receivers (RX1, TX2, RX3, TX4, RX5, TX6, RX7, TX8, TX9, RX10) are provided at a second end of the optical fiber 210, each optical transmitter and receiver configured to transmit and receive an optical link (respectively).

Optical network 200 further includes a first course wide division multiplex (CWDM) terminal 202. The first CWDM terminal 202 is connected at a first end to the first plurality of optical transmitters and receivers. The first CWDM terminal 202 is configured to route optical links bi-directionally between the first plurality of optical transmitters and receivers and the optical fiber 210. The second CWDM terminal 204 is connected to the second plurality of optical transmitters and receivers and the optical fiber 210. The second CWDM terminal 204 is configured to route optical links bi-directionally between the second plurality of optical transmitters and receivers and the optical fiber 210.

In the exemplary embodiment, the optical network 200 is configured to operate with ten communications channels (TX/RX1, TX/RX2, . . . TX/RX10). The optical network 200 makes use of nine separate wavelengths ($\lambda 1, \lambda 2, \ldots \lambda 9$). Communications channels TX/RX9 and TX/RX10 make use of a single wavelength, $\lambda 9$.

In this exemplary embodiment, the first coarse wavelength division multiplexing (CWDM) terminal 202 is configured with equipment as may be known in the art for generating, transmitting and receiving optical signals in an optical communications system. Similarly, the second coarse wavelength division multiplexing (CWDM) terminal 204 is configured with equipment as may be known in the art for generating, transmitting and receiving optical signals in an optical communications system.

The first coarse wavelength division multiplexing (CWDM) terminal 202 is also configured with combiner/splitter 206 which is configured to provide for communicating data with a single band of wavelengths ($\lambda 9$) using two separate optical links (TX/RX9 and TX/RX10) over optical fiber 210. The second coarse wavelength division multiplexing (CWDM) terminal 204 is also configured with combiner/splitter 208 which is configured to provide for communicating data with a single band of wavelengths ($\lambda 9$) using two separate optical links (TX/RX9 and TX/RX10) over the optical fiber 210.

Figure 3:
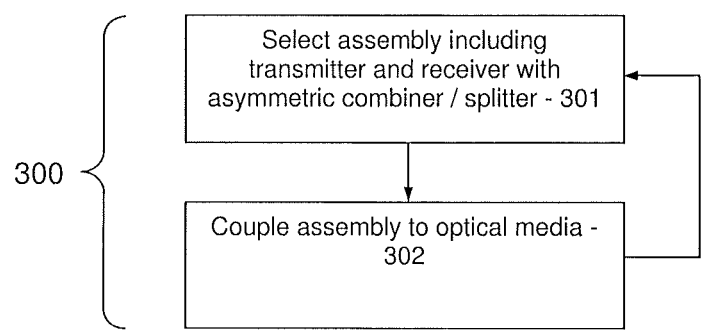
FIG. 3 is a flow chart depicting an exemplary method according to this disclosure.

FIG. 3 depicts an exemplary method for assembling an optical network according to the teachings herein. In the exemplary method for optical network assembly 300, a first step 301 calls for selecting an assembly that includes an optical transmitter, an optical receiver and a combiner/splitter. In a second step 302, the assembly is coupled to optical media, such as an optical fiber. The first step 301 and the second step 302 may be repeated as many times as needed to complete the optical network.

Having set forth exemplary embodiments, some additional aspects are now introduced.

The teachings herein may be applied in any type of optical communication system and/or architecture deemed appropriate. For example, in some other embodiments of a coarse wavelength division multiplexing (CWDM) system, at least some of the other wavelengths ($\lambda 1, \lambda 2, \ldots \lambda 8$) are used for "same wavelength multiplexing" techniques as provided for with regard to FIG. 5.

The optical transmitter may include any device deemed appropriate. Generally, optical transmitters are selected for insensitivity to low levels of optical interference at the operational wavelength of the optical transmitter. That is, in general, each optical transmitter is substantially insensitive to wavelengths received from the opposing optical transmitter (as a result of attenuation by the two combiner/splitter elements in combination with the properties of the optical transmitter). In some embodiments, the optical transmitter includes a Fabry Perot laser. In some other embodiments, the optical transmitter includes a discrete coaxial packaged laser, a small form pluggable (SFP) transceivers, a small form pluggable plus (SFP+) transceivers (if using FP) and other such devices.

The optical receiver may include any device deemed appropriate. Generally, optical receivers are selected for sensitivity to low levels of optical signals at the operational wavelength. In some embodiments, the optical receiver includes any one of a discrete coaxial packaged photodiode, a SFP transceivers, a SFP+ transceivers any other similar device.

Wavelengths may be centered around any wavelength deemed appropriate. For example, wavelengths may be centered about groupings used by conventional optical systems. More specifically, wavelengths selected for use in a communications channel may be centered about any one of 1270, 1310, 1350, 1400, 1480, 1550, and 1630 nm.

Optical combiners/splitters may employ any distribution of transmittance ratios, $T_R$, deemed appropriate. For example, the transmittance ratios, $T_R$, may include high/low combinations such as: 95/5, 90/10, 85/15, 80/20, 75/25, 70/30 and ratios there between.

Other optical devices may be included. For example, a variety of optical couplings and associated components may be included.

The combiner/splitter units selected may operate on any principle deemed appropriate. For example, in some embodiments, the combiner/splitter using polarizing technology. Attenuators, absorbers, reflectors, birefringent elements and other such components may be included within the combiner/splitter (or elsewhere) within the communications system.

The optical media may include a continuous fiber, an optical network, or any other optical system deemed appropriate. It is not required that the optical media be a single, continuous fiber. For example, in some embodiments, at least another splitter may be incorporated. That is, in some embodiments, one combiner/splitter is coupled to one end of the optical media, while an opposing combiner/splitter is coupled to an opposing end of the optical media. In some other embodiments, such as where intermediate couplings, other devices and/or multiple operators are used, one combiner/splitter is coupled to the optical media, while another combiner/splitter is remotely coupled to the optical media.

One set of wavelengths is substantially the same as another set of wavelengths if systems using the wavelengths are functionally adequate in performance.

Various other components may be included and called upon for providing for aspects of the teachings herein. Standards of performance are to be judged by a system designer, manufacturer, user or other similarly interested party. The term "substantial" as used herein generally relates to adequacy of resulting system performance.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for providing an optical network configured for bi-directional communication using optical signals, the method comprising:

selecting a first operator comprising a first optical transmitter and a second optical receiver optically coupled to a first asymmetric optical combiner/splitter, the first asymmetric optical combiner/splitter coupling the first operator to a first end of optical media;

selecting a second operator comprising a second optical transmitter and a second first optical receiver optically coupled to a second asymmetric optical combiner/splitter, the second asymmetric optical combiner/splitter remotely coupled to the optical media;

attenuating a first signal transmitted from the first optical transmitter based on a low transmittance ratio, $T_R$, corresponding to the first asymmetric optical combiner/splitter prior to providing the first signal to the optical media;

attenuating the first signal received from the optical media based on a high transmittance ratio, $T_R$, corresponding to the second asymmetric optical combiner/splitter prior to providing the first signal to the first optical receiver;

attenuating a second signal transmitted from the second optical transmitter based on a low transmittance ratio, $T_R$, corresponding to the second asymmetric optical combiner/splitter prior to providing the second signal to the optical media; and attenuating the second signal received from the optical media based on a high transmittance ratio, $T_R$, corresponding to the first asymmetric optical combiner/splitter prior to providing the second signal to the second optical receiver; and selecting the second optical transmitter for operation at substantially a same wavelength as the first optical transmitter.

2. The method of claim 1, further comprising associating the low transmittance ratio, $T_R$, of each of the first and second asymmetric combiner/splitters with a respective one of the first and second optical transmitters.

3. The method of claim 2, further comprising associating the high transmittance ratio, $T_R$, of each of the first and second asymmetric combiner/splitters with a respective one of the first and second optical receivers.

4. The method of claim 3, wherein the high transmittance ratio, $T_R$, and the low transmittance ratio $T_R$ comprise a combination of ratios that is one of 95/5, 90/10, 85/15, 80/20, 75/25, 70/30, and a ratio therebetween.

5. The method of claim 3, wherein the first optical transmitter is substantially insensitive to optical interference received at an operational wavelength of the optical network.

6. The method of claim 5, wherein the second optical transmitter is substantially insensitive to optical interference received at the operational wavelength of the optical network.

7. The method claim 4, further comprising selecting a Fabry-Perot laser as at least one of the first and second optical transmitters.

8. The method of claim 3, wherein the high transmittance ratio, $T_R$, and the low transmittance ratio, $T_R$, comprise a combination of ratios that is about 90/10.

* * * * *

UNITED STATES PATENT AND TRADEMARK OFFICE
CERTIFICATE OF CORRECTION

PATENT NO. : 10,135,561 B2
APPLICATION NO. : 15/655228
DATED : November 20, 2018
INVENTOR(S) : Pinhas Yehuda Rosenfelder et al.

Page 1 of 1

It is certified that error appears in the above-identified patent and that said Letters Patent is hereby corrected as shown below:

On the Title Page

On page 9, Column 1, item (56), other publications, Line 46, delete "Berkely" and insert -- Berkeley --, therefor.

On page 9, Column 2, item (56), other publications, Line 60, delete "Propogation" and insert -- Propagation --, therefor.

On page 10, Column 2, item (56), other publications, Line 53, delete "Concept n" and insert -- Concept in --, therefor.

On page 10, Column 2, item (56), other publications, Line 61, delete "Transcations" and insert -- Transactions --, therefor.

In the Claims

In Column 9, Line 5, Claim 7, delete "method" and insert -- method of --, therefor.

Signed and Sealed this
Tenth Day of December, 2024

Katherine Kelly Vidal
*Director of the United States Patent and Trademark Office*